United States Patent [19]

Ichikawa et al.

[11] 4,211,897
[45] Jul. 8, 1980

[54] MULTIFREQUENCY SIGNAL RECEIVING SYSTEM

[75] Inventors: Akira Ichikawa, Kokubunji; Kazuo Nakata, Kodaira; Kazuhito Hirose, Kamikuratamachi, all of Japan

[73] Assignee: Hitachi, Ltd., Japan

[21] Appl. No.: 942,557

[22] Filed: Sep. 15, 1978

[30] Foreign Application Priority Data

Sep. 16, 1977 [JP] Japan .................................. 52/110590
Jun. 14, 1978 [JP] Japan .................................. 53/70905

[51] Int. Cl.² ........................ H04M 1/50; G01R 23/02
[52] U.S. Cl. ................................... 179/84 VF; 364/728
[58] Field of Search .................. 179/84 VF; 364/484, 364/485, 728; 328/138, 140; 343/100 CL; 324/78 D

[56] References Cited

U.S. PATENT DOCUMENTS

| | | | |
|---|---|---|---|
| 3,937,899 | 2/1976 | Denenberg | 179/84 VF |
| 4,025,730 | 5/1977 | Sawai | 179/84 VF |
| 4,100,378 | 7/1978 | Claasen et al. | 179/84 VF |

*Primary Examiner*—Bernard Konick
*Assistant Examiner*—Joseph A. Popek
*Attorney, Agent, or Firm*—Craig & Antonelli

[57] ABSTRACT

A multifrequency signal receiving system comprising a filter for whitening a received signal, a correlator for extracting partial autocorrelation coefficients from the output of the whitening filter, a prediction error analyzer for judging the presence or absence of the multifrequency signal by analyzing prediction analysis errors from the output of the whitening filter, and a control unit responsive to the output of the analyzer indicative of the presence of the multifrequency signal for determining the frequency included in the received signal using the partial autocorrelation coefficients thereby identifying that the received signal is the multifrequency signal.

12 Claims, 14 Drawing Figures

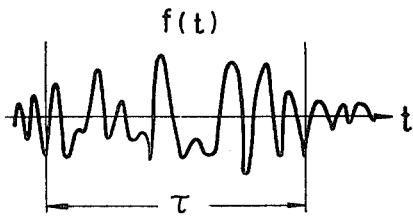
FIG. 7A
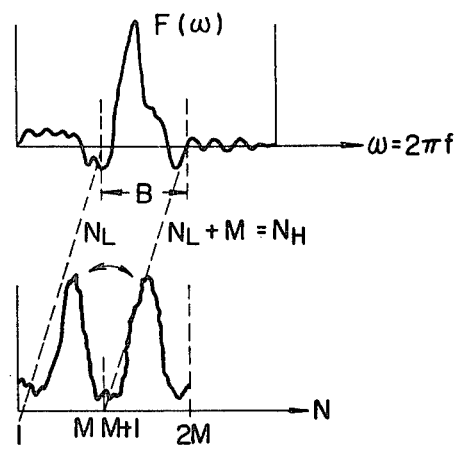
FIG. 7B
FIG. 7C
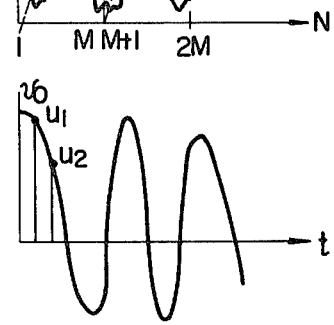
FIG. 7D
FIG. 8
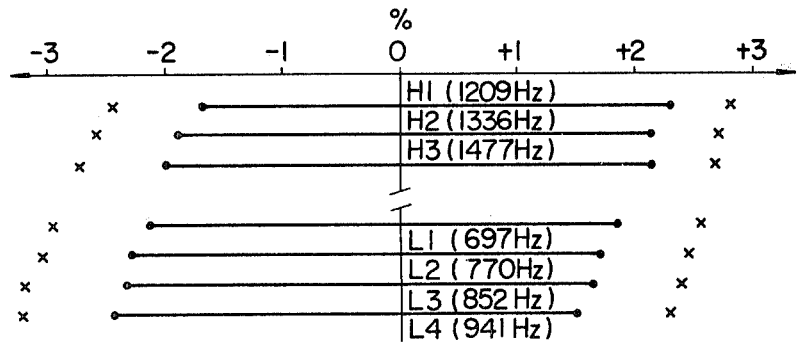

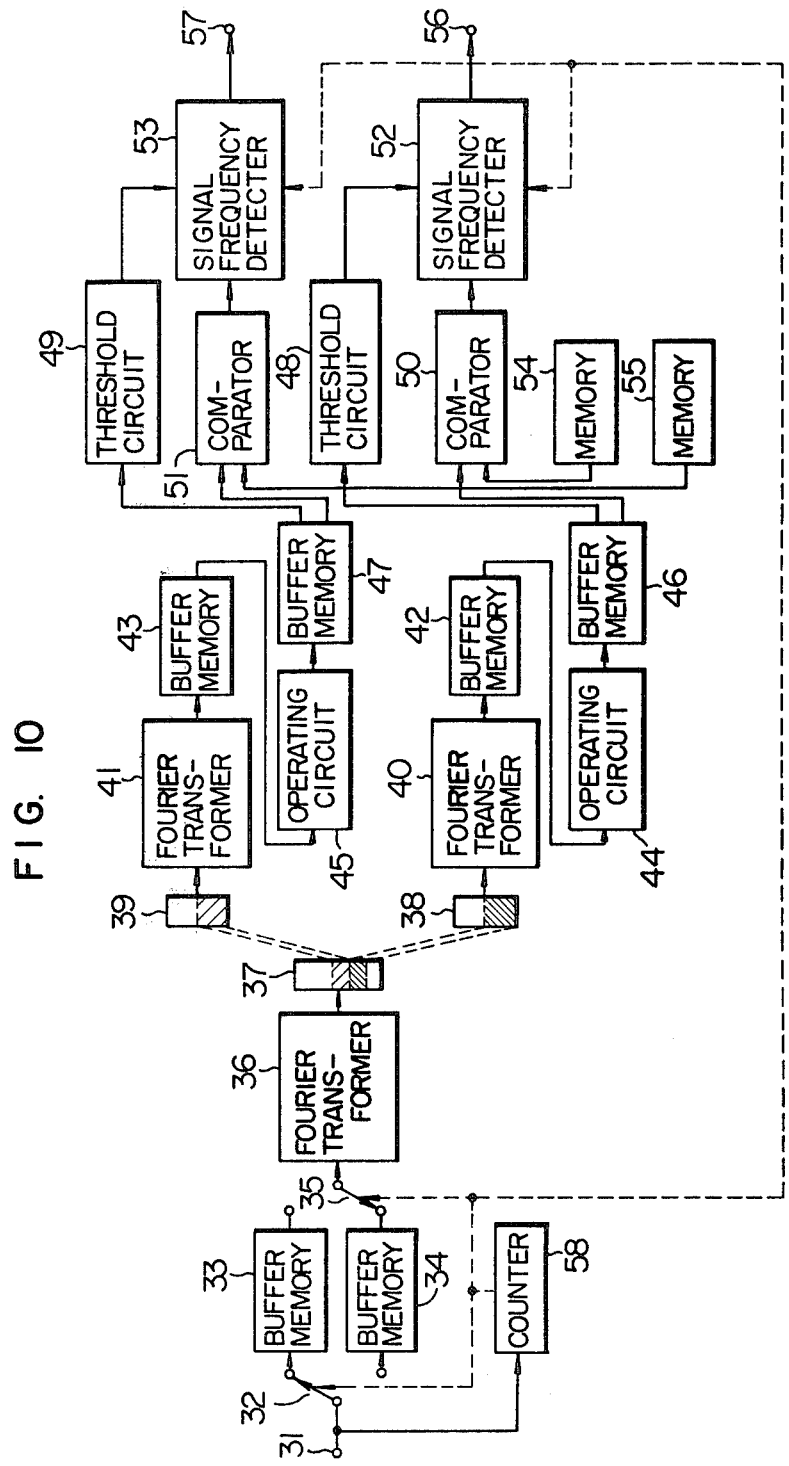

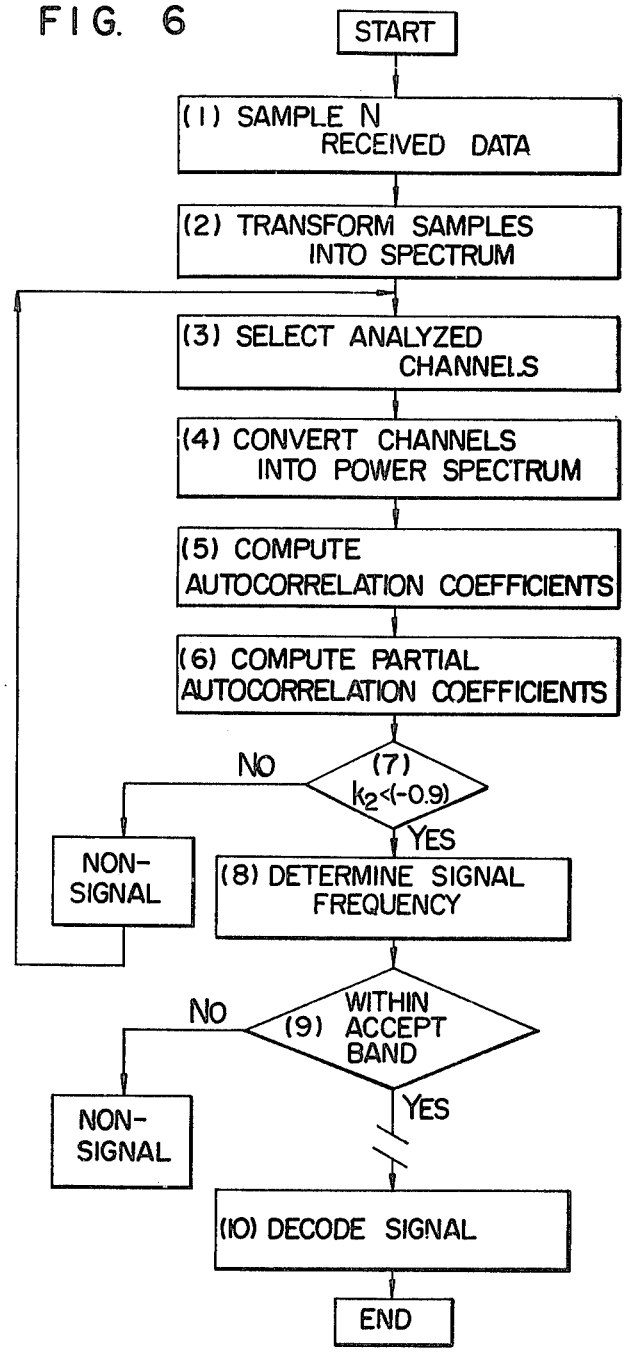

MULTIFREQUENCY SIGNAL RECEIVING SYSTEM

This invention relates to a multifrequency signal receiving system, and more particularly to a receiving system for use in a receiver receiving a coded digital multifrequency signal.

Most of the conventional systems used for receiving a coded digital multifrequency signal have been designed to convert the received digital multifrequency signal into an analog signal to receive such an analog signal by an analog receiver. Various systems for directly receiving a coded digital multifrequency signal have also been proposed hitherto and include a system in which analog filters of an analog receiver are replaced by digital filters, a system including means for making the discrete Fourier transformation (DFT) on the received signal, a system including means for determining the mutual correlation between the waveform of the received signal and that of a reference frequency signal, a system including means for measuring the interval between zero-crossings of the received signal, and a system including means for expanding the received signal waveform with a special function and determining the correlation between the received waveform and the expanded waveform. However, the proposed systems have a common drawback that the operation must be wastefully made on unnecessary frequency bands which including no components of the multifrequency signal input, resulting in a reduced multioperation ability of the receiver and in an increase in the cost of the receiver. The prior art systems are also defective in that they cannot detect the multifrequency signal input with a sufficiently high accuracy when the sampling frequency is of the order of, for example, 8 kHz used for the PCM digital coding of telephone message signals.

It is therefore an object of the present invention to provide a multifrequency signal receiving system for application to a digital time division telephone exchange system of the PCM type, which can detect a multifrequency signal with a high accuracy and can ensure high degree of multiplex transmission even when the sampling frequency is low or lower than the conventional value of, for example, 8 kHz.

Another object of the present invention is to provide a multifrequency signal receiving system which obviates such an undesirable phenomenon that a waveform such as a voice signal waveform other than the multifrequency signal waveform is erroneously received as an input signal. (Such an undesired input signal will be referred to hereinafter as an imitation.)

Still another object of the present invention is to provide a multifrequency signal receiving system which is most suitable for receiving a multifrequency signal such as a push button signal generated from a push button dial.

One of the important features of the present invention resides in the fact that the system comprises a processing unit for analyzing a received signal and extracting, from the received signal, those parameters sufficient for the required representation of the character of a multifrequency signal so as to identify the received signal on the result of analysis by the processing unit.

The present invention is further featured by the fact that the analysis error detected during the analysis is evaluated to prevent reception of an imitation.

The present invention is further featured by the fact that a specific frequency band only of a received signal is selected from the result of frequency spectrum analysis of the received signal, and a partial autocorrelation coefficient is computed on the basis of the power spectrum of this specific frequency band.

The foregoing and other objects as well as the characteristic features of the present invention will become more apparent from the following detailed description and the appended claims when read in conjunction with the accompanying drawings, in which:

FIG. 6 is a flow chart showing, by way of example, the processing sequency when the present invention is specifically adapted for the reception of a push button signal;

FIGS. 7A to 7D illustrate the successive steps of processing a received signal waveform and its frequency spectrum according to the processing sequence shown in FIG. 6;

FIGS. 8 and 9 show the results of an experiment on a push button signal and a voice signal processed according to the processing sequence shown in FIG. 6, in which FIG. 8 shows the signal frequency detection characteristic for the push button signal, and FIG. 9 shows, by way of example, the values of a partial autocorrelation coefficient $k_2$ of the push button signal and the voice signal;

FIG. 10 shows another embodiment of the present invention suitable for carrying out the processing sequence shown in FIG. 6.

Figure 1:
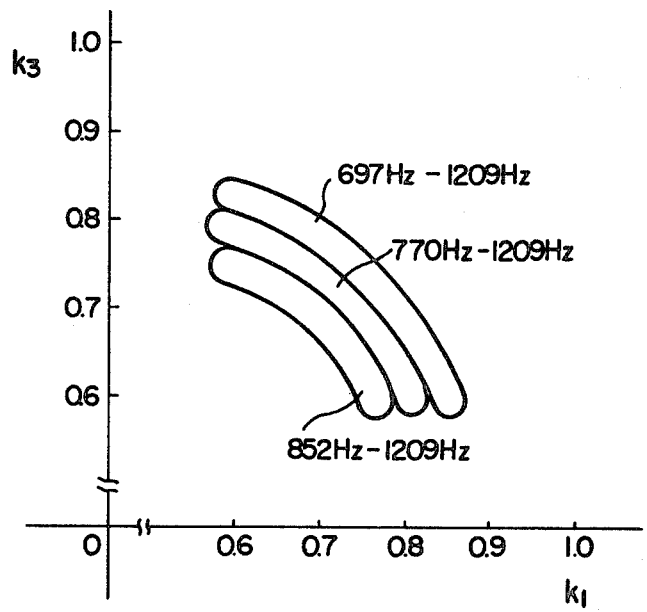
FIG. 1 illustrates, by way of example, the distribution of some of the parameters employed in the present invention.

In a conventional multifrequency signal receiving system used in, for example, a two-frequency push button signal receiver employing digital filters, the manner of signal processing is such that the digital filters operate as band-pass filters for seven frequencies (for example, a low frequency group of 697 Hz, 770 Hz, 852 Hz and 941 Hz, and a high frequency group of 1,209 Hz, 1,336 Hz and 1,447 Hz) regardless of the presence or absence of the two-frequency input signal so as to detect or identify such an input signal. In contrast, the manner of signal processing in the system according to the present invention is such that only two signal frequencies are detected to identify the two-frequency input signal.

The system according to the present invention comprises a processing unit for analyzing a received signal and extracting those parameters sufficient for the required identification of a two-frequency sinusoidal waveform signal, and this processing unit is not adequate for the analysis of a complex input signal such as a voice signal. Thus, not only the values of the extracted parameters of the voice signal differ from those of the multifrequency signal, but also, the analysis error becomes so large, so that reception of an imitation can be reliably obviated by detecting these values. In other words, the system has the dual ability of obviating the reception of an imitation.

Prediction analysis techniques are practical means suitable for the processing of an input waveform to be analyzed. Typical well-known prediction analysis techniques include a technique for extracting a linear prediction coefficient (which is also called an α-parameter) and a technique for extracting a partial autocorrelation coefficient (which is also called a PARCOR coefficient or a k-parameter). This partial autocorrelation coefficient is described in detail in, for example, U.S. Pat. No. 3,662,115 (issued to Saito et al., May 9, 1972) and a book entitled "Linear Prediction of Speech" pp. 32–41, written by J. D. Markel & A. H. Gray, Jr. and published by Springer-Verlag.

These parameters will be collectively called prediction coefficients hereinafter. A multifrequency signal including n frequencies (the combination of a plurality of sinusoidal waveform signals) can be essentially expressed by 2n prediction coefficients. A push button (PB) signal and a multifrequency (MF) signal of two frequencies can thus be expressed by four prediction coefficients. For the practical purpose, however, it is desirable to increase the number of parameters from four to five or six due to the presence of a power unbalance between the two signal frequencies. Practical examples will be described later. According to the basic principle of the present invention, reception of an imitation is initially checked utilizing the level of the prediction analysis error, and then, the input signal is identified on the basis of the values of the prediction coefficients or the values of secondary parameters derived from these prediction coefficients.

The prediction coefficients, which are the parameters used for the analysis, are expressed as a function of autocorrelation coefficients of a waveform. For simplicity of description, a one-frequency signal will be taken as an example. An ith-order autocorrelation coefficient $v_i$ of a signal having a period $\omega$ is given by $$v_i = a^2/2 \cos \omega_i T \quad (1)$$

where T is the sampling period, and a is the signal amplitude. The value of $v_i$ is close to $a^2/2$ when the sampling period T is very small, and it is apparent from the equation (1) that the variation sensitivity for a variation in the period $\omega$ is very low. That is, T of a very small value, in other words, an excessively high rate of sampling is not necessarily desirable. Thus, for all the values of the period of the multifrequency signal, the resolving power of frequency can be increased when the variation sensitivity is high for a variation in the period $\omega$, that is, whe the value of $\omega_i T$ is close to $\pi/2$. In the case of the push button (PB) signal and multifrequency (MF) signal of two frequencies, therefore, the desirable sampling frequency is about 4 kHz which is the half of 8 kHz which is the sampling frequency used in the PCM telephone exchange. This is because, when the frequency is normalized so that 4 kHz corresponds to $2\pi$, then, $\pi/2$ corresponds to 1 kHz which is relatively close to the individual signal frequencies of a multifrequency signal. Thus, in the system of the present invention, analysis is applied to a multifrequency signal waveform such as a digital PCM waveform which is obtained by sampling at the sampling frequency of 8 kHz and from which one data out of every two data is omitted. Consequently, the number of steps required for the signal processing can be reduced to the half, and a receiver can be constructed which has a doubled multioperation ability in spite of the provision of the same processing unit.

The present invention will now be described in detail with reference to the drawings. In the present invention, the partial autocorrelation method is used for processing a signal to be analyzed. The k-parameter can be regarded to be an orthonalized equivalent of the linear prediction coefficient $\alpha$ used for the linear prediction analysis of a waveform. Thus, the k-parameter is equivalent to the linear prediction coefficient $\alpha$, and these are interchangeable.

In the embodiment which will be described presently, a push button (PB) signal of two frequencies will be taken as an example of a multifrequency signal. The frequency spectrum of the PB signal waveform including such two frequencies (sinusoidal waveforms) only is expressed by the following equation (2):

$$H(z) = \frac{\sigma^2}{A_4(z)} = \frac{\sigma^2}{\alpha_0 z^4 + \alpha_1 z^3 + \alpha_2 z^2 + \alpha_3 z + 1} \quad (2)$$

where $z = e^{-j\lambda}$, $-\pi \leq \lambda \leq \pi$, and $\sigma^2$ represents the intensity of spectrum. The frequencies $f_i$ are given by $$f_i = f_s \arg [z_i]/2\pi = \frac{f_s}{2\pi} \tan^{-1} [\frac{I_m [z_i]}{R_e [z_i]}]$$

when the roots of $\alpha_0 z^4 + \alpha_1 z^3 + \alpha_2 z^2 + \alpha_3 z + 1 = 0$ are $z_i = re^{j\theta_i}$, i=1, 2. In the equation giving the frequencies $f_i$, $f_s$ is the sampling frequency, and Re[ ] and Im[ ] represent the real number part and the imaginary number part of the complex roots respectively. Thus, the input signal can be identified as the multifrequency signal by finding the values of $\{\alpha_i\}$ (i=0, ... 4) from the input signal. In the present embodiment, $\{k_i\}$ is computed as it is equivalent to this $\{\alpha_i\}$ and it can be more easily computed than $\{\alpha_i\}$ in view of the construction of the hardware. Then, the values of $\{k_i\}$ are converted into the signal frequencies to detect the multifrequency signal, since $\{k_i\}$ provides the secondary parameter which facilitates the identification of the input signal. As described already, the frequencies $\theta_i$ are computed from $z_i = e^{j\theta_i}$ which represents the roots of $A_4(z) = 0$. It is to be noted, however, that $\theta_i$ represents the frequency which is normalized according to the relation $0 \leq \theta \leq 2\pi$.

Under an assumption, $A_4(z) = 0$ can be substituted by a quadratic equation. (Generally, the denominator $A_{2n(z)}$ of the frequency spectrum of a multifrequency signal of n frequencies is of the 2n-th degree. However, this $A_{2n(z)} = 0$ can also be substituted by an equation of n-th degree under an assumption.)

Generally suppose now that n multifrequency signals are a resonance output of a resonator which is completely open at the output end and is terminated by a matching resistor at the input end. This resonator is composed of (n+1) acoustic tubes connected together, and the parameters $k_1$ to $k_n$ are nominally associated with the reflection coefficients due to mismatching between these acoustic tubes. It can be supposed that the resonance loss is given only by the matching resistance at the input end, and no lesses occur in the intermediate tubes (that is, $k_0 = 1$ and $k_{n+1} = 0$). Further, n k-parameters are derived from a waveform. Transformation to the denominator of the equation (2) can be made according to the following recurrence formula (3):

$$A_n(z) = A_{n-1}(z) + k_n z B_{n-1}(z)$$

$$B_n(z) = z B_{n-1}(z) + k_n A_{n-1}(z)$$

$$A_0(z) = 1$$

$$B_0(z) = -1 \qquad (3)$$

Suppose, then, that the input end of the resonator is now turned into a completely open end. In such a case, $k_{n+1} = 0$ is substituted by $k_{n+1} = 1$, and due to the disappearance of the resonance loss, the spectrum waveform includes n spectrum lines.

Thus, the denominator of the equation (2) is replaced by an equation of 5th degree $A_5(z)$ since now $k_5 = 1$ instead of $k_5 = 0$. However, due to the fact that the resonator is now completely open at both the input and output ends, $A_5(z)$ is divisible by $(1-z)$, that is, passage of direct current is permitted. Further, due to the absence of the losses, $A_5(z)$ has roots symmetrical with respect to $z^2$ on unit circle depicted on the z-plane.

$$\begin{aligned} A_5(z) &= (1-z) g_4(z) \qquad (4)\\ &= (1-z)z^2[a_2 + 2a_1(z^1 + z^{-1})/2 \\ &\quad + 2a_0(z^2 + z^{-2})/2] \\ &= (1-z)z^2(a_2 + 2a_1 T_1(x) + 2a_0 T_2(x)) \\ &= (1-z)z^2 \, 4q_2(x) \end{aligned}$$

where $T_i(x)$ is the Tchebycheff's polynominal, and $x = (z + z^{-1})/2 = \cos \lambda$. Since $T_1(x) = x$ and $T_2(x) = 2x^2 - 1$, $4q_2(x)$ is represented by a quadratic equation as follows:

$$4q_2(x) = 4a_0 x^2 + 2a_1 x + (a_2 - 2a_0) = 0 \qquad (5)$$

Analysis of a multifrequency signal of n frequencies similarly provides an equation of n-th degree.

The recurrence formula (3) is successively expanded to provide the following equation (6):

$$A_5(z) = C_0 z^5 + C_1 z^4 + C_2 z^3 + C_3 z^2 + C_4 z + C_5 \qquad (6)$$

When the equation (6) is combined with an expansion of the equation (4), the result provides the following values:

$$\left. \begin{aligned} a_0 &= -C_0 \\ a_1 &= -(C_0 + C_1) \\ a_2 &= -(C_0 + C_1 + C_2) \end{aligned} \right\} \qquad (7)$$

Thus, the coefficients $a_0$, $a_1$ and $a_2$ of the quadratic equation can be determined in the order of the equations (3), (7) and (5) on the basis of the values of $k_1$ to $k_4$, and $k_5 = 1$. The values of x computed from the equation $$x^2 + \frac{C_0 + C_1}{2C_0} x - \frac{C_0 - C_1 - C_2}{4C_0} = 0$$

can be substituted in $\lambda = \cos^{-1}(x)$ to determine the frequencies. However, since $\lambda$ is a function of x alone, the values of x may be directly used to determine the input signal frequencies. The input signal frequencies may be determined from the values of the coefficients in the quadratic equation. Further, the input signal frequencies may be determined from the values of $C_1$ and $C_2$ since the value of $C_0$ is $-1$ in this case. (This is the same in an equation (8) described later.)

In the case of, for example, the push button (PB) signal, two frequencies having a level difference therebetween must be received, and it is also required to analyze the multifrequency signal with a limited accuracy. Under such limitations, the signal of two frequencies is not always sufficiently analyzed by finding merely the values of the coefficients $k_1$ to $k_4$. It is apparent that the accuracy of analysis can be improved by finding the values of the coefficients $k_1$ to $k_5$, and yet, the equation to be solved is also a quadratic equation in this case. The equation to be solved in this case is as follows:

$$x^2 + \frac{C_1'}{2C_0} x - \frac{C_0 - C_2'}{4C_0} = 0 \qquad (8)$$

where $C'$ represents the coefficient of $A_6(z)$ and is computed by substituting the values of $k_1$ to $k_5$ and $k_6 = 1$ in the recurrence formula (3).

It is naturally possible to identify the input signal on the basis of the values of k only without computing the values of x. However, this manner of identification requires very complex steps and is thus not always expedient, since the values of k are distributed in a four-dimensional hyperspace like the coats of an onion when the input signal fluctuates within an allowable range. FIG. 1 shows, by way of example, the values of the coefficients $k_1$ and $k_3$ projected on a plane to illustrate part of the combination of the frequencies of the push button (PB) signal.

The practical technique for finding the values of the k-parameters is broadly classified into the direct method and the indirect method. The former is the technique of directly extracting the k-parameters from an input waveform and includes a lattice method and a modified lattice method, and this technique is suitable for analysis with the hardware provided exclusively for the purpose. The latter is the technique of solving simultaneous linear equations including the autocorrelation coefficients or covariance coefficients of an input waveform as their coefficients, and a microcomputer may be used for solving these equations.

The covariance method which requires a small number of data for the processing of an input signal is preferably employed for extracting the k-parameters from the input waveform portion within the guard time, and the modified lattice method may also be programmed to comply with this covariance method. The modified lattice method forming one aspect of the direct method is such that successive data are effectively utilized to successively find the k-parameters of from the lower to the higher order and is thus suitable for analyzing a limited small number of data with high accuracy.

Figure 2:
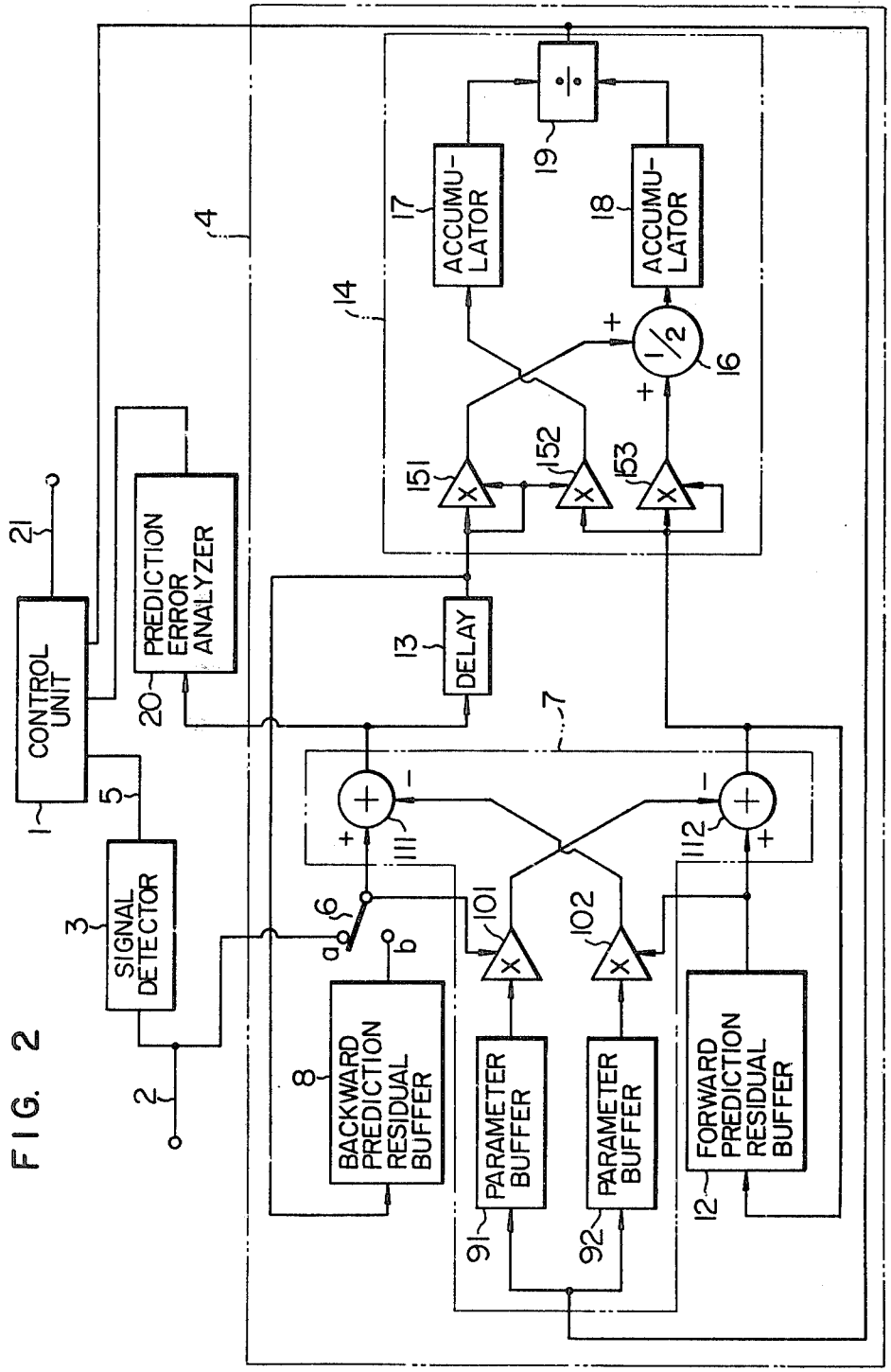
FIG. 2 is a block diagram of an embodiment of the system according to the present invention.

FIG. 2 shows the structure of an embodiment of the present invention constructed on the basis of the above considerations. The operation will be described with reference to the case of only one channel for simplicity of explanation. It is apparent, however, that multiple processing according to the usual digital time division technique can be carried out since the data are digitally processed. In such a case, a buffer memory may be provided for each channel.

Referring now to FIG. 2, a control unit 1 which may be a microcomputer performs the control functions including computing the roots of the quadratic function (5) and determining whether an input signal is an imitation or not. The control signal lines extending from the control unit 1 to various controlled units are not shown in FIG. 2. A digital coded input signal 2 is divided into a portion applied to a signal detector 3 and another portion applied to a k-parameter extracting unit 4. It is supposed herein that the input signal is sampled at a sampling frequency of 4 kHz. The signal detector 3 monitors the amplitude of the input signal and detects the application of such an input signal when the sum of the amplitudes of data applied for a length of time corresponding to 16 sampling periods (4 milliseconds) exceeds a predetermined value, thereby applying an output signal 5 to the control unit 1 to indicate that the input signal is received. In response to the application of the signal 5 from the signal detector 3, the control unit 1 instructs to change over a switch 6 in the k-parameter extracting unit 4 from its position a to the position b in 28 milliseconds (corresponding to 112 sampling periods) after the detection of the input signal, so that the extracting unit 4 can extract the coefficients $k_1$, $k_2$, . . . . The input signal applied to the k-parameter extracting unit 4 passes through the switch 6 in the position a, a whitening filter 7 and a one-sampling-period delay buffer 13 (a one-word register) to be stored in a backward prediction residual (error) buffer 8 which may be a shift register. The whitening filter 7 includes a pair of k-parameter buffers 91 and 92 in which the initial values of $-1$ and 0 are previously stored respectively. The whitening filter 7 further includes a pair of multipliers 101, 102 and a pair of adders 111, 112 so that it acts to whiten the input signal by removing from the input signal the signal components that can be predicted by the values of k stored at that time. The k-parameter extracting unit 4 further includes a forward prediction residual (error) buffer 12 which is also a shift register. Each of the backward and forward prediction residual (error) buffers 8 and 12 has a capacity of 128 words and holds the signal for 32 milliseconds (4 milliseconds corresponding to the 16 samples detected within the signal detection time plus 28 milliseconds corresponding to the succeeding 112 samples). Simultaneously with the application of the input signal 2 to the backward prediction residual (error) buffer (shift register) 8 through the switch 6 in the position a and through the adder 111 and delay buffer (one-word register) 13, the input signal 2 is also applied to a correlator 14 through the route including the delay buffer 13 and the route including the multiplier 101 and adder 112, so that the k-parameters are initially extracted in the correlator 14 to be supplied to the control unit 1 and k-parameter buffers 91 and 92. The correlator 14 is composed of three multipliers 151, 152 and 153, a ½ adder 16 (constructed to provide a one-bit displaced output representing ½ of the added value), a pair of accumulators 17 and 18 each accumulating a maximum of 128 data, and a divider 19 finding the quotient of the accumulated values of these accumulators 17 and 18 after each having accumulated 128 data. The correlator 14 has the function of extracting the k-parameters from the correlation between the backward and forward prediction residuals.

For the purpose of control according to the covariance method, it is desirable to exclude initial i data among the input data in the course of computation of parameters $k_i$. Thus, the accumulators 17 and 18 are controlled so as not to accumulate these initial i data. A portion of the output of the adder 112 is accumulated in the forward prediction residual (error) buffer 12 which is also a shift register as described. After the extraction of the parameter $k_1$ on the basis of the analysis of the 128 input data, the switch 6 is changed over to the position b under control of the control unit 1, and the contents of the backward and forward prediction residual (error) buffers 8 and 12 are now regarded as an input so as to extract the parameters $k_2$, $k_3$, . . . in a manner similar to the extraction of the parameter $k_1$. In the case of the input processing according to the equation (8), a prediction error analyzer 20 evaluates the power level of the prediction analysis residual for the parameter $k_5$ at the adder 111 after the extraction of the parameters $k_1$ to $k_5$, and when the power level is lower than a predetermined value, it applies to the control unit 1 a signal indicative of the possibility of the input signal to be a multifrequency signal. This decision may be made utilizing the information in residual used in the computation of the parameter $k_5$. In response to the application of the signal from the prediction error analyzer 20, the control unit 1 solves the quadratic equation (8) using the analyzed values of the parameters $k_1$ to $k_5$ and $k_6=1$ so as to identify the input signal frequencies. An output signal 21 appears from the control unit 1 when the identified frequencies are proved to lie within the frequency bands to be received. When the equation (7) is used in lieu of the equation (8), processing can be similarly carried out using the values of $k_1$ to $k_4$ and $k_5=1$. In lieu of the division by the divider 19, a corresponding internal program may be prepared in the control unit 1 to find the quotient, and the values of $k_i$ thus obtained may be supplied to the k-parameter buffers 91 and 92.

Figure 3:
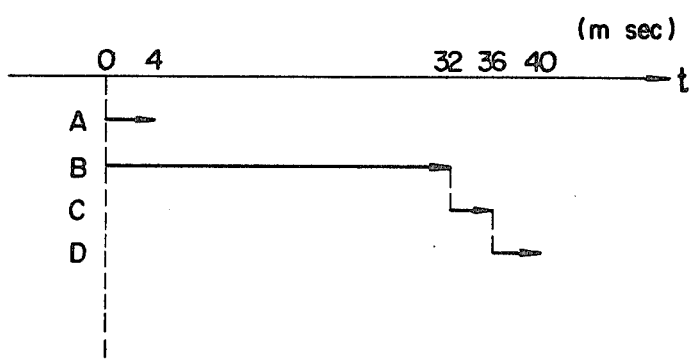
FIG. 3 is a time chart illustrating the operation of the embodiment shown in FIG. 2.

FIG. 3 is a time chart illustrating the operation of the embodiment shown in FIG. 2. The input signal starts to be applied at time $t=0$. In the period A, the signal detector 3 monitors the applied input signal. In the period B of 32 milliseconds corresponding to the 128 samples, the input data are supplied to the backward prediction residual (error) buffer 8 through the whitening filter 7 in parallel relation with the application of the input signal to the signal detector 3. In the period C following the supply of the data to the backward prediction residual (error) buffer 8 during the period B of 32 milliseconds corresponding to the 128 samples, the paremters $k_1$ to $k_5$ are extracted. In the period D following the period C, the control unit 1 solves the quadratic equation to identify the input signal when the result of evaluation by the prediction error analyzer 20 has proved that the input signal is possibly a multifrequency signal. When the result of signal detection by the signal detector 3 has proved that no input signal is applied, the signal detector 3 continues its signal detecting operation. Although the data are supplied to the prediction residual (error) buffers 8 and 12 during the period of time in which the signal detector 3 is making its signal detecting operation, such data overflow from the buffers 8 and 12 and disappear without adversely affecting the subsequent operation after the buffers 8 and 12 have received 112 data subsequent to the signal detection by the signal detector 3. Further, the initial state at time $t=0$ is restored as soon as the result of prediction error analysis or frequency analysis proves that the input signal is not a multifrequency signal. In such an instant, the processing starting timing is delayed by 4 milliseconds in a worst case, since, in this embodiment, input data are supplied to the prediction residual (error) buffer 8 in parallel relation with the signal detection by the signal detector 3. However, this delay does not give rise to any substantial problem due to the fact that the required data occupy a length of time of 32 milliseconds, and the delay of 4 milliseconds is sufficiently included within the guard time. Such a problem can be naturally obviated when an input signal buffer is provided independently of the backward prediction residual (error) buffer 8. The essence of the present invention resides in the manner of signal processing, and various modifications may be made in the manner of signal processing.

Figure 4:
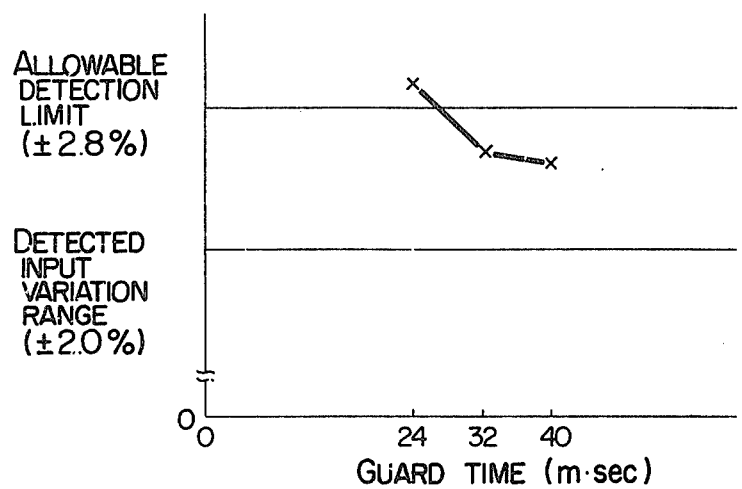
FIG. 4 shows the relation between the guard time and the signal frequency detection accuracy to illustrate the notable effect of the present invention.

FIG. 4 illustrates, by way of example, the relation between the guard time and the signal detection accuracy. In FIG. 4, the push button (PB) signal frequency of 697 Hz was combined with each of the frequencies in the high frequency group, and data were actually measured to find the relation between the frequency detectable range and the guard time when the high and low frequencies were allowed to vary within ±2% of the standard values with a level variation of ±15 dB. It was proved that every combination of the low frequency and high frequency showed similar tendency.

Figure 5:
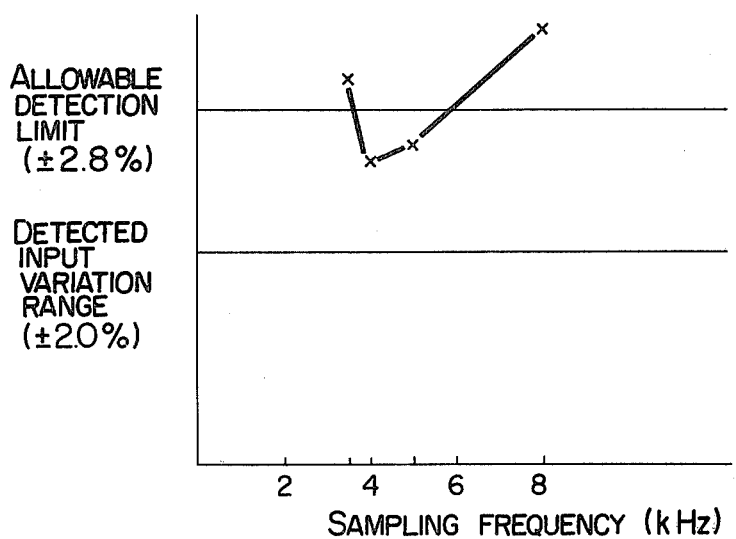
FIG. 5 shows the relation between the sampling frequency and the signal frequency detection accuracy to illustrate the notable effect of the present invention.

FIG. 5 illustrates the results of measurement when the relation between the sampling frequency and the signal frequency detection accuracy was measured on the push button (PB) signal frequency of 697 Hz under the same conditions as those in FIG. 4. It will be seen from FIG. 5 that the sampling frequency of 4 kHz is more preferable than 8 kHz. In FIG. 5, the guard time is 32 milliseconds. The results of measurement on other frequencies were similar to FIG. 5.

The guard time checking function and signal identification checking function can be realized by monitoring the output signal of the input signal detector 3 or of the prediction error analyzer 20 by the control unit 1 at predetermined time intervals and providing logical decision on the basis of the resultant time pattern. In the case of the guard time checking, for example, it is decided that an input signal is present when the output signal of the time detector 3 appears ten times at time intervals of 4 milliseconds, and it is regarded that the same signal is continuously applied when no discontinuity of more than a predetermined length of time appears after the ten consecutive appearances of the output signal from the signal detector 3.

A lattice type filter may be used to provide the circuit used in the hardware for finding the coefficients Ci or Ci' from the k-parameters. Such a computation may be made according to the recurrence formula (3). However, it is economical to make this computation in the control unit 1 since the circuit of the above type is operated only once in each time of signal reception, resulting in a low utilization efficiency.

It will be understood from the above description of the embodiment of the present invention that the steps of processing essentially required for the signal identification purpose are merely performed without making unnecessary wasteful processing. Further, the system has the double function of preventing reception of an unnecessary signal such as a so-called imitation other than the necessary multifrequency signal. Furthermore, the system can satisfactorily detect input data although the data sampling frequency is the half of 8 kHz used in the PCM telephone exchange, that is, although the supplied data are the half of the PCM input signal. The present invention having these features can provide a highly efficient digital multifrequency signal receiver which is substantially free from mal-operation and which can make a high degree of multiprocessing. Although the push button (PB) signal of two frequencies has been taken as an example of the input signal in the aforementioned embodiment, it is apparent that the present invention is similarly effectively applicable to all the types of multifrequency signal receivers adapted for receiving signals such as an MF signal, an MFC signal and an n-frequency signal.

In the signal receiving system described hereinbefore, a quartic equation must ordinarily be solved in order to determine the two signal frequencies of a two-frequency input signal. A quadratic equation must be solved even when the symmetry of conjugate complex roots and the sole requirement for determining the frequencies only are taken into consideration. Thus, the aforementioned system requires relatively complex steps for the signal processing resulting in difficulty of sufficiently shortening the signal processing time. Further, in the aforementioned system, it is necessary to provide a high-pass filter or a band-pass filter in order to remove, from a received input signal, the 400-Hz tone signal which is generated in response to the take-up of the handset to indicate whether the line permits message transmission or is busy.

However, in a multifrequency signal such as a PB signal, each of the four frequencies constituting the high frequency group and each of the three frequencies constituting the low frequency group are selected, and the suitable combinations of these two frequencies are made to correspond to the individual numerals of the dial, as described already. Therefore, the signal frequency bands are limited to the specific bands of low and high frequencies, and only one frequency is included in each of these specific bands.

The above fact is noted to provide a method which can determine the two frequencies of such a PB signal. This method comprises subjecting a received input signal to frequency spectrum analysis, selectively deriving from the frequency spectrum the spectrum portion of the specific frequency band including one signal frequency only, computing partial autocorrelation coefficients on the basis of the power spectrum of the specific frequency band, and solving a linear equation so as to determine the signal frequency included in the specific frequency band.

The basic principle will now be described below in which the indirect method is employed for solving the linear equation.

Suppose that the solution of a linear algebraic equation including autocorrelation coefficients $v_o$ to $v_p$ of time orders o to p is given by a linear prediction coefficient $\alpha_i^{(p)}$, and $k_i$ is a partial autocorrelation coefficient. Then, the following relation holds therebetween:

$$k_i = \alpha_i^{(i)} \qquad (9)$$

It will thus be seen that the partial autocorrelation coefficient $k_i$ of time order i is equal to the linear prediction coefficient $\alpha_i^{(i)}$ of i-th degree obtained by solving the linear algebraic equation including the autocorrelation coefficients $v_o$ to $v_i$ of time orders o to i. Therefore, the relation shown in the following equation is obtained, for example:

$$\left.\begin{array}{l} k_1 = \alpha_1^{(1)} \\ k_2 = \alpha_2^{(2)} \end{array}\right\} \qquad (10)$$

The linear prediction coefficient $a_1^{(1)}$ of 1st degree obtained by solving the linear algebraic equation including the autocorrelation coefficients $v_0$ and $v_1$ of time orders 0 and 1 is given by the following equation:

$$a_1^{(1)} = v_1/v_0 \quad (11)$$

The linear algebraic equation including the autocorrelation coefficients $v_0$ to $v_2$ of time orders 0 to 2 is expressed as follows:

$$\begin{pmatrix} v_0 & v_1 \\ v_1 & v_0 \end{pmatrix} \begin{pmatrix} a_1^{(2)} \\ a_2^{(2)} \end{pmatrix} = - \begin{pmatrix} v_1 \\ v_2 \end{pmatrix} \quad (12)$$

The linear prediction coefficient $a_2^{(2)}$ of 2nd degree obtained by solving the above equation (12) is as follows:

$$a_2^{(2)} = v_0 v_2 - v_1^2 / v_0^2 - v_1^2 \quad (13)$$

Suppose now that the signal included in the selected specific frequency band is limited to a single sinusoidal waveform signal $f(t)$ [$= a \sin \omega t$]. Then, the autocorrelation coefficient $v_i$ in this case is given by the following equation (14):

$$\begin{aligned} v_i &= \int f(t) \cdot f(t + iT) \, dt \\ &= \int a \sin \omega t \cdot a \sin \omega(t + iT) \, dt \\ &= \tfrac{1}{2} a^2 \cos \omega iT \end{aligned} \quad (14)$$

where T is the sampling period. From this equation (14), the autocorrelation coefficients $v_0$ to $v_2$ of time orders 0 to 2 are respectively given by the following equations (15) to (17):

$$v_0 = \tfrac{1}{2} a^2 \quad (15)$$

$$v_1 = \tfrac{1}{2} a^2 \cos \omega t \quad (16)$$

$$v_2 = \tfrac{1}{2} a^2 \cos 2\omega T = \tfrac{1}{2} a^2 (2 \cos^2 \omega T - 1) \quad (17)$$

Therefore, from the equations (11), (13) and (15) to (17), the partial autocorrelation coefficients $k_1$ and $k_2$ are respectively expressed by the following equations (18) and (19):

$$k_1 = v_1/v_0 = \cos \omega T \quad (18)$$

$$k_2 = (v_0 v_2 - v_1^2)/v_0^2 - v_1^2 = -1 \quad (19)$$

In this manner, the partial autocorrelation coefficient $k_1$ of 1st degree and the partial autocorrelation coefficient $k_2$ of 2nd degree can be found from the received signal portion in the specific frequency band. On the basis of the value of $k_1$, the signal frequency $\omega = 2\pi f$ can be computed. Further, depending on whether the value of $k_2$ is close to $-1$, the received signal can be distinguished to be a single sinusoidal waveform signal or a signal such as a voice signal having an expanding frequency spectrum.

A manner of realizing a signal receiving system based upon the above principle will now be described.

FIG. 6 is a flow chart showing a processing sequence in such a signal receiving system, and FIGS. 7A to 7D illustrate the successive steps of processing a received signal waveform and its frequency spectrum according to the processing sequence shown in FIG. 6.

In the processing step (1) in FIG. 6, a received signal waveform $f(t)$ as shown in FIG. 7A is sampled by a sampling signal at a sampling frequency fs [Hz]. This sampling continues for a minimum length of time required at least for detecting the presence of an input signal. Suppose that this width of time window is $\tau$ seconds. Then, the number N of samples processed during this period is given by the following equation (20):

$$N = \tau \cdot fs \quad (20)$$

Considering the Fourier transformation described later, this number N is conveniently selected to be powers of 2, or $N = 2^m$.

In the processing step (2), the N sample values obtained by the sampling are subjected to the Fourier transformation to obtain a frequency spectrum $F(\omega)$ as shown in FIG. 7B. In this case, the frequency resolving power $\Delta f$ due to the Fourier transformation of the N sample values is given by the following equation (21):

$$\Delta f = fs/N \quad (21)$$

In the processing step (3), the desired signal frequency band, that is, the low or high frequency band of the PB signal is determined to find the power spectrum in the selected frequency band. Suppose that $f_L$ [Hz] and $f_H$ [Hz] are the lower limit and upper limit frequencies of this frequency band. Then, the selected band width B [Hz] and the center frequency fc [Hz] are expressed respectively by the following equations (22) and (23):

$$B = f_H - f_L \quad (22)$$

$$fc = (f_L + f_H)/2 \quad (23)$$

Suppose that $N_L$ and $N_H$ are the channel numbers corresponding to the lower limit frequency $f_L$ [Hz] and upper limit frequency $f_H$ [Hz] respectively. Then, these channel numbers $N_L$ and $N_H$ are selected to satisfy the equation equations (24) and (25) respectively:

$$N_L = [\frac{f_L}{\Delta f} + 0.5] = [N(\frac{f_L}{fs}) + 0.5] \quad (24)$$

$$N_H = [\frac{f_H}{\Delta f} + 0.5] = [N(\frac{f_L}{fs}) + 0.5] \quad (25)$$

In the equations (24) and (25), the symbol [ ] indicates that the value is rounded to be a closest integer. Therefore, the number M of the channels in the selected frequency band is given by the following equation (26):

$$M = N_H - N_L + 1 \quad (26)$$

This number M is conveniently selected to be powers of 2, or $M = 2^b$, for the purpose of the inverse Fourier transformation described later.

In the processing step (4), the portion of the spectrum corresponding to the channels Nos. $N_L$ to $N_H$ in FIG. 7B is selected, and its power spectrum is found to provide the power spectrum of the channels Nos. 1 to M. This power spectrum is obtained by a frequency shift of the power spectrum obtained from FIG. 7B so that the channel No. $N_L$ corresponds to the new channel No. 1, and the channel No. $N_H$ corresponds to the new channel No. M. Then, the power spectrum of the channels Nos. 1 to M is symmetrically turned over to provide a power spectrum of channels Nos. (M+1) to 2M. Consequently, a symmetrical power spectrum pattern as shown in FIG. 7C is obtained.

In the processing step (5), the autocorrelation coefficients $v_0$, $v_1$ and $v_2$ are computed as shown in FIG. 7D by means of the inverse Fourier transformation on the power spectrum of 2M channels. In lieu of the inverse Fourier transformation, the cosine transformation equivalent thereto may be utilized in the processing step (5) to compute these autocorrelation coefficients.

In the processing step (6), the partial autocorrelation coefficients $k_1$ and $k_2$ are computed on the basis of the autocorrelation coefficients $v_0$, $v_1$ and $v_2$ according to the equations (18) and (19).

In the processing step (7), whether the value of the partial autocorrelation coefficient $k_2$ thus computed is larger or smaller than $-0.9$ is judged, and when the result of judgment proves that the value of $k_2$ is larger than $-0.9$, it is decided that the signal in the selected frequency band is not the PB signal having the sinusoidal waveform, and the processing jumps back to the processing step (3). On the other hand, when the value of $k_2$ is smaller than $-0.9$, the processing step (8) takes place in which the computed value of the partial autocorrelation coefficient $k_1$ is used to determine the signal frequency f according to the following equation (27):

$$f = f_L + B \cos^{-1}(k_1)/\pi \qquad (27)$$

In the processing step (9), the presence of the computed signal frequency f within the selected accept band (the frequency range in which the PB signal is to be received) is judged, and when the computed signal frequency f does not lie within the accept band, the signal is decided to be other than the PB signal.

The signal frequency in the high frequency band of the PB signal is similarly detected in the processing steps (3) to (9). In the processing step (10), the PB signal thus detected is decoded. Thus, when, for example, the low frequency band of the PB signal is first selected, and a signal frequency in the low frequency band is determined in the processing step (9), the processing jumps back to the processing step (3) to select the high frequency band, and the similar processing steps are repeated. The PB signal detected as a result of the above processing is finally decoded in the processing step (10).

Figure 9:
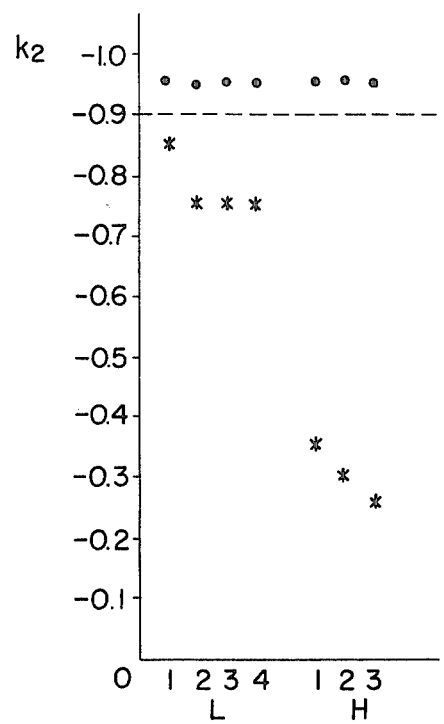

FIGS. 8 and 9 show, by way of example, the results of an experiment on a PB signal and a voice signal processed according to the processing sequence shown in FIG. 6, in which FIG. 8 shows the signal frequency detection characteristic for the PB signal, and FIG. 9 shows the values of the partial autocorrelation coefficient $k_2$ of the PB signal and the voice signal.

In FIG. 8, the vertical axis represents the high frequency groups of frequencies H1 (1,209 Hz), H2 (1,336 Hz) and H3 (1,477 Hz) and the low frequency group of frequencies L1 (697 Hz), L2 (770 Hz), L3 (852 Hz) and L4 (941 Hz) of the PB signal, and the horizontal axis represents the relative accuracy of signal frequency detection in percentage. The solid lines in FIG. 8 represent the detected frequency ranges when the in-band signal frequencies of the two signals in all the combinations of the high and low frequency bands were allowed to vary up to ±2.0% and the relative amplitudes of the two signals were allowed to vary up to ±15 dB, while the symbols X represent the detected frequencies of out-band signals which had frequencies higher by 2.8% and more than those of the PB signal. In the horizontal axis representing the relative accuracy of signal frequency detection, the percentage is given by $(f/f_o - 1) \times 100$ where f is the actually detected frequency and $f_o$ is the corresponding PB signal frequency. In this example, the sampling frequency $f_s$ is 4 kHz, and the number N of samples is 128.

It will be seen from FIG. 8 that a so-called uncertain band (a range which may not be preferably receive any signal) is present between the signal frequency detection range of the accept band permitting up to ±2.0% frequency variation and each of the adjacent signal frequency ranges of reject bands in which the detected frequency is higher by ±2.8% and more than the PB signal frequency. Thus, the PB signal in the accept can be clearly distinguished from the signal in the reject band.

In FIG. 9, the dots represent, by way of example, the values of the partial autocorrelation coefficient $k_2$ obtained when the PB signal frequencies L1 to L4 and H1 to H3 are received, while the asterisks * represent, by way of example, the values of the partial autocorrelation coefficient $k_2$ obtained when some frequencies of a voice signal are received.

It will be seen from FIG. 9 that the value of $k_2$ is necessarily smaller than $-0.9$ when a PB signal is received, while it is larger than $-0.9$ when a voice signal is received. Thus, the voice signal can be reliably rejected by selecting the threshold value of $k_2$ at $-0.9$.

FIG. 10 shows another embodiment of the multifrequency signal receiving system suitable for carrying out the processing sequence shown in FIG. 6.

The multifrequency signal receiving system shown in FIG. 10 comprises a signal input terminal 31, change-over switches 32 and 35, buffer memories 33, 34, 37, 38, 39, 42, 43, 46 and 47, high-speed Fourier transformers 36, 40 and 41, operating circuits 44 and 45, threshold circuits 48 and 49, comparators 50 and 51, signal frequency detectors 52 and 53, setting memories 54 and 55, signal output terminals 56 and 57, and a counter 58.

In operation, a digital signal obtained by sampling an original signal at a sampling frequency of, for example, 8 kHz is applied to the input terminal 31 to be stored in the buffer memory 33 or 34 through the change-over switch 32. This change-over switch 32 is changed over at time intervals of, for example, 32 milliseconds, and one sampled data of every two sampled data in the digital input signal applied to the input terminal 31 is omitted to provide the data input sampled at a sampling frequency of, for example, 4 kHz so as to store such a data input in the buffer memory 33 or 34. Therefore, the input signal portions each corresponding to a predetermined analysis time length of, for example, 32 milliseconds are stored in the buffer memories 33 and 34 respectively. Thus, the 128 sampled data in the input digital signal are stored in each of the buffer memories 33 and 34 when the analysis time length is 32 milliseconds, and the sampling frequency at the buffer memories is 4 kHz as described above.

Upon completion of writing of the data in one of the buffer memories 33 and 34, the switch 32 is changed over to start writing of the data in the other buffer memory 34 or 33. At the same time, the switch 35 is changed over so that the data stored in the buffer memory 33 or 34 are supplied to the high-speed Fourier transformer 36 to be subjected to the Fourier transformation. The frequency spectrum obtained as the result of the Fourier transformation is stored in the buffer memory 37 in the order of the channels corresponding to the ranges of from dc to high frequencies. The output of the Fourier transformer 36 represents a complex number including a real number part resulting from the cosine transformation and an imaginary number part resulting from the sine transformation.

Subsequently, the channels corresponding to the low frequency band of the PB signal, for example, the 16 channels of from $N_L=18$ to $N_H=33$, and the channels corresponding to the high frequency band of the PB signal, for example, the 16 channels of from $N_L=34$ to $N_H=49$, are selected from the frequency spectrum information stored in the buffer memory 37 and are converted into power spectra which are stored in the low band buffer memory 38 and high band buffer memory 39 respectively. In each of these buffer memories 38 and 39, the power spectrum of the channels 1 to 16 stored therein is turned over around the last channel or 16th channel of the stored power spectrum to provide a power spectrum of channels 17 to 32. The symmetrical power spectra stored in this manner in the respective buffer memories 38 and 39 are used to carry out parallel detection of the signal in the low frequency band and the signal in the high frequency band. Since the manners of signal detection in the low and high frequency bands are entirely the same, the manner of signal detection in the low frequency band will be described in detail, by way of example.

The information stored in the buffer memory 38, that is, the symmetrical power spectrum information of channels 1 to 2M, for example, 1 to 32 is subjected to the inverse Fourier transformation in the high-speed Fourier transformer 40 to initially extract three components which are the autocorrelation coefficients $v_0$, $v_1$ and $v_2$. These autocorrelation coefficients $v_0$, $v_1$ and $v_2$ are stored in the buffer memory 42. The operating circuit 44 computes the partial autocorrelation coefficients $k_1$ and $k_2$ on the basis of the values of the autocorrelation coefficients $v_0$, $v_1$ and $v_2$ according to the equations (18) and (19), and the computed values of the partial autocorrelation coefficients $k_1$ and $k_2$ are stored in the buffer memory 46.

The partial autocorrelation coefficients $k_1$ and $k_2$ corresponding to the individual signal frequencies of the low and high frequency bands of the PB signal can take values such as those shown in Table 1.

Table 1

| | Signal frequency (Hz) | Range of $k_1$ | $k_2$ |
|---|---|---|---|
| Low band | 697 | 0.65–0.50 | $<-0.9$ |
| | 770 | 0.27–0.07 | $<-0.9$ |
| | 852 | −0.23—−0.44 | $<-0.9$ |
| | 941 | −0.69—−0.85 | $<-0.9$ |
| High band | 1,209 | 0.65–0.38 | $<-0.9$ |
| | 1,336 | 0.07—−0.40 | $<-0.9$ |
| | 1,477 | −0.08—−0.96 | $<-0.9$ |

The partial autocorrelation coefficients $k_1$ and $k_2$ take the values specified in Table 1 when the sampling frequency is 4 kHz, the number of samples is 128 (corresponding to the analysis time length of 32 milliseconds), the selected low and high band channels are channels 18 to 33 and channels 34 to 49 respectively, the accept band signal frequency variation range is within ±2.0%, and the reject band frequency variation range is over ±2.8%.

The memories 54 and 55 store the values of $k_1$ corresponding to the low and high band signal frequencies shown in Table 1 respectively. The comparator 50 compares the value of the partial autocorrelation coefficient $k_1$ stored in the buffer memory 46 with the value of $k_1$ stored in the memory 54, and when the former lies within the range of the latter stored in the memory 54, the comparator 50 applies the corresponding signal frequency to the signal frequency detector 52. The value of the partial autocorrelation coefficient $k_2$ stored in the buffer memory 46 is checked by the threshold circuit 48. When the value of $k_2$ is larger than the threshold value of, for example, −0.9, the threshold circuit 48 acts to inhibit the output of the signal frequency detector 52 since it detects that the input signal is not the PB signal. On the other hand, when the value of $k_2$ is smaller than the threshold value of −0.9, the threshold circuit 48 permits the application of the signal frequency corresponding to the value of $k_1$ to the output terminal 56 from the signal frequency detector 52. Therefore, only when the values of the partial autocorrelation coefficients $k_1$ and $k_2$ lie within the predetermined ranges, that is, only when the value of $k_2$ is smaller than −0.9 and the value of $k_1$ lies within the range shown in Table 1, the corresponding signal frequency appears at the output terminal 56.

Figure 11:
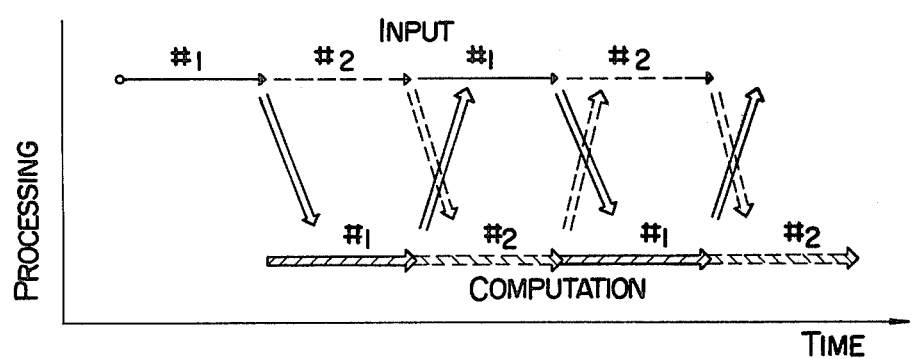
FIG. 11 illustrates the manner of continuous signal processing in the embodiment shown in FIG. 10.

The counter 58 counts the number of input samples and provides a timing signal output to complementarily change over the change-over switches 32 and 35 thereby attaining continuous signal processing as shown in FIG. 11. Suppose that #1 and #2 are data supplied to the input buffer memories 33 and 34 respectively. The data #1 is initially supplied to the buffer memory 33, and upon completion of storage of the data #1 in the buffer memory 33, the data #2 is supplied to the buffer memory 34. At the same time, the data #1 stored in the buffer memory 33 is supplied to the processing means including the Fourier transformer 36 to be subjected to various kinds of computation above described. Upon completion of storage of the data #2 in the buffer memory 34, the next data #1 is supplied to the buffer memory 33, and the data #2 stored in the buffer memory 34 is supplied to the processing means including the Fourier transformer 36 to be subjected to necessary computation. Such operations are repeated for the continuous signal processing.

In the manner above described, the low and high band signal frequencies of the PB signal appear at the respective output terminals 56 and 57 so that the dialed signal can be detected.

In the embodiment described with reference to FIG. 10, independent circuits are provided for parallel detection of the signal frequency in the low frequency band and the signal frequency in the high frequency band of the PB signal. However, a single common circuit may be provided to process the data in a time division mode when there is an enough time margin for the processing in this mode.

In the embodiment described with reference to FIG. 10, high-speed Fourier transformers are employed to make the Fourier transformation of the input signal and also to make the inverse Fourier transformation of the power spectrum to extract the autocorrelation coefficients. In lieu of the Fourier transformers, means including a microcomputer and a memory may be used to make the cosine transformation and sine transformation of data thereby attaining the Fourier transformation and computation of the autocorrelation coefficients. In such a case, the Fourier transformation may be applied to the necessary frequency channels only so that the autocorrelation coefficients of time orders 0 to 2 may only be extracted. This is advantageous in that the memory capacity can be correspondingly reduced, and the computation can be simplified.

It is well known that the extraction of the autocorrelation coefficients from the power spectrum can also be attained by the cosine transformation of the power spectrum, and it is thus not necessarily required to turn over the power spectrum to obtain the symmetrical spectrum which is subjected to the inverse Fourier transformation, since the power spectrum is symmetrical in itself.

Further, although the signal frequency f is determined on the basis of the value of the partial autocorrelation coefficient $k_1$ stored in the memory 54 in the embodiment described with reference to FIG. 10, the signal frequency f may be directly computed according to the equation (27) on the basis of the detected value of the partial autocorrelation coefficient $k_1$.

Furthermore, a processing unit such as a microcomputer may be used to process the input signal according to a pre-set program.

The partial autocorrelation coefficient $k_2$ is computed by division as shown in the equation (13) or (19). However, an undesirable reduction in the accuracy will result from the simple computation by the hardware using the integers each represented by a limited number of bits. Therefore, the equation (19) may be modified as $$k_2' = [(v_0 v_2 - v_1^2) + (v_0^2 - v_1^2)]/v_0^2 \qquad (28)$$

so that whether the received signal is sinusoidal or not can be checked on the basis of, for example, $|k_2'| < 0.2$.

It will be understood from the foregoing description of the embodiment of the present invention shown in FIG. 10 that the partial autocorrelation coefficients $k_1$ and $k_2$ only are extracted from the signal frequency spectrum of the specific band including only one frequency, so that these partial autocorrelation coefficients $k_1$ and $k_2$ can be very simply computed according to the equations (18) and (19). Thus, the received signal can be very simply processed within a short period of time in spite of the fact that the structure of the system is quite simple.

The partial autocorrelation coefficient $k_2$ or $k_2'$ computed according to the equation (19) or (28) can be used to readily judge whether the received signal is a PB signal or a voice signal so that reception of an imitation can be completely obviated.

Further, the tone signal of 400 Hz can be completely eliminated due to the fact that analysis is applied to the selected band only.

In the embodiment described with reference to FIG. 10, the partial autocorrelation coefficient $k_2$ or $k_2'$ computed according to the equation (19) or (28) is utilized to judge whether the received signal is an imitation or not. However, reception of an imitation can be similarly obviated when the whitening filter 7 shown in FIG. 2 is employed, and the values of $k_i$ computed from the general equation (9) are supplied to the parameter buffers 91 and 92 to find the prediction residual errors which are supplied to the prediction error analyzer 20 to be analyzed.

Although the present invention has been described with reference to its application to the reception of a PB signal, by way of example, it is apparent that the present invention is in no way limited to such a specific application and is generally applicable to the reception of a multifrequency signal including one signal frequency in each of a plurality of bands.

What is claimed is:

1. A multifrequency signal receiving system comprising means for extracting from a received signal a plurality of prediction coefficients the number of which is determined depending on the character of the received signal, and means responsive to the output of said extracting means for identifying the received signal by detecting frequencies included in the received signal.

2. A multifrequency signal receiving system as claimed in claim 1, wherein said extracting means includes a whitening filter for extracting a prediction residual error from the received signal and a correlator responsive to the output of said whitening filter for extracting the prediction coefficients.

3. A multifrequency signal receiving system as claimed in claim 2, further comprising means responsive to the output of said whitening filter for judging the possibility of presence of the received signal by analyzing the prediction residual error thereby preventing reception of an imitation.

4. A multifrequency signal receiving system as claimed in claim 1, wherein each of said prediction coefficients is a partial autocorrelation coefficient.

5. A multifrequency signal receiving system as claimed in claim 1, wherein a partial autocorrelation coefficient is expressed in the form of a line spectrum for identifying the received signal.

6. A multifrequency signal receiving system as claimed in claim 1, wherein said extracting means comprises first means for extracting autocorrelation coefficients from the received signal and second means for extracting the prediction coefficients from the autocorrelation coefficients.

7. A multifrequency signal receiving system as claimed in claim 6, further comprising a whitening filter extracting a prediction residual error on the basis of said prediction coefficients, and means responsive to the output of said whitening filter for judging the possibility of presence of the received signal by analyzing the prediction residual error thereby preventing reception of an imitation.

8. A system for receiving a multifrequency signal including one signal frequency in each of a plurality of specific frequency bands, comprising means for subjecting the received multifrequency signal to frequency spectrum analysis, means for extracting, from said frequency spectrum obtained by the analysis, the spectrum portion of one of said specific frequency bands including one signal frequency only so as to obtain the corresponding power spectrum, means for extracting partial autocorrelation coefficients from said power spectrum, and means for determining said specific signal frequency on the basis of said partial autocorrelation coefficients.

9. A multifrequency signal receiving system as claimed in claim 8, wherein said spectrum extracting means comprises means for subjecting the power spectrum including the one signal frequency of said specific frequency band to a frequency shift to obtain a frequency-shifted power spectrum and means for obtaining a symmetrical power spectrum on the basis of the frequency shifted power spectrum.

10. A multifrequency signal receiving system as claimed in claim 8, wherein the presence or absence of the one signal frequency within said specific frequency band is judged on the basis of the value of one of said partial autocorrelation coefficients.

11. A multifrequency signal receiving system as claimed in claim 8, wherein said multifrequency signal is a push button signal generated from a push button dial.

12. A multifrequency signal receiving system as claimed in claim 8, wherein said coefficient extracting means comprises means for subjecting the power spectrum to the inverse Fourier transformation to extract a plurality of autocorrelation coefficients and means for obtaining the partial autocorrelation coefficients on the basis of the autocorrelation coefficients from said subject means.

* * * * *